United States Patent [19]

Saigo et al.

[11] Patent Number: 4,984,829
[45] Date of Patent: Jan. 15, 1991

[54] SCREW COUPLING JOINT

[75] Inventors: Takeshi Saigo, Kawasaki; Tomohiko Tokuya; Haruo Kamimura, both of Yokohama; Mitsuaki Hori, Kamakura; Hidenori Yasuoka, Kawasaki, all of Japan

[73] Assignee: Nippon Kokan Kabushiki Kaisha, Tokyo, Japan

[21] Appl. No.: 184,454

[22] Filed: Apr. 21, 1988

Related U.S. Application Data

[63] Continuation-in-part of Ser. No. 171,212, Mar. 17, 1988, abandoned, which is a continuation of Ser. No. 937,459, Dec. 2, 1986, abandoned, which is a continuation of Ser. No. 790,636, Oct. 23, 1985, abandoned, which is a continuation of Ser. No. 409,975, Aug. 20, 1982, abandoned.

[30] Foreign Application Priority Data

Apr. 16, 1982 [JP] Japan ................... 54409[U]

[51] Int. Cl.$^5$ .............................................. F16L 25/00
[52] U.S. Cl. ................................. 285/334; 285/334.4; 285/351; 285/369; 285/383
[58] Field of Search .............. 285/333, 334, 355, 390, 285/383, 351, 369, 333, 334, 334.4

[56] References Cited

U.S. PATENT DOCUMENTS

| 1,218,359 | 3/1917 | Beatty | 285/334 X |
|---|---|---|---|
| 1,932,427 | 10/1933 | Stone | 285/334 |
| 2,532,632 | 12/1950 | MacArthur | 285/334 X |
| 2,992,019 | 7/1961 | MacArthur | 285/334 X |
| 3,870,351 | 3/1975 | Matsuki | 285/334 |
| 4,085,951 | 4/1978 | Morris | 285/351 X |
| 4,153,283 | 5/1979 | Hellmund et al. | 285/334 |
| 4,384,737 | 5/1983 | Reusser | 285/334 |

FOREIGN PATENT DOCUMENTS

| 1243605 | 7/1967 | Fed. Rep. of Germany | 285/333 |
|---|---|---|---|
| 1220856 | 1/1971 | Fed. Rep. of Germany | 265/334 |
| 2438387 | 2/1976 | Fed. Rep. of Germany | 285/333 |
| 53-1928 | 1/1978 | Japan . | |
| 60-60392 | 4/1985 | Japan . | |
| 2074685 | 11/1981 | United Kingdom | 285/333 |

*Primary Examiner*—Dave W. Arola
*Attorney, Agent, or Firm*—Armstrong, Nikaido, Marmelstein, Kubovcik & Murray

[57] ABSTRACT

A screw coupling joint having a sealing portion between an outer circumference formed in convex in an axial direction of the coupling joint at the end of the male screw portion and an inner circumference formed in taper at an inner part of the female screw portion. The female screw portion has a stopper end positioned to be contacted, when the coupling joint is assembled, by the inner end of the male screw portion. The taper is between 1° and 3° and the inner diameter $D_1$ of the female screw and the outer diameter $D_2$ of the male screw have the relationship $D_2 > D_1$ at a tangent point therebetween. The end of the male screw portion and the end of the stopper are vertical or perpendicular to the axis of the coupling joint.

4 Claims, 1 Drawing Sheet

SCREW COUPLING JOINT

BACKGROUND OF THE INVENTION

This application is a continuation-in-part of application Ser. No. 171,212, filed Mar. 17, 1988, in turn a continuation of application Ser. No. 937,459, filed Dec. 2, ,1986, in turn a continuation of application Ser. No. 790,636, filed Oct. 23, 1985, in turn a continuation of application Ser. No. 409,975, filed Aug. 20, 1982, now abandoned, and relates to a screw coupling joint having a metal sealing portion particularly adapted for use in oil wells.

A known screw coupling joint for use in oil wells is provided with a metal sealing portion between an outer circumference formed in the convex at an end of a male screw and an inner circumference formed in taper in the inner part of a female screw. However, because such coupling, when made up into a joint generally has a clearance between the end of the male screw and the terminal of the female screw, eddy currents are caused in the clearance and corrosion is accelerated. In such structure having such clearance, the male screw is easily driven too much and hoop tension is exceeded, subjecting the female screw to over tensioning and inviting stress corrosion at the clearance. In addition to the above mentioned sealing structure, there has been proposed a coupling joint which is provided with a stopper at the inner end of the female screw for contacting the end portion of the male screw, and the end portions of the male screw and stopper are formed in obliquity around 10° to 30°, respectively. Depending upon such structure, the clearance is not formed. The pushing-up force act on the male portion, due to the obliquity, so that the outer circumference of the male screw, forming the seal, is strongly urged to the inner circumference of the female screw and the sealing property is advantageously improved. However, for actuating the pushing-up force, it is necessary to urge the end portion of the male screw to the end portion of the stopper and, therefore, the bending effect or tearing-off force by the wedging effect act on this part and it is easily affected with stress corrosion.

The purpose of this invention is to improve coupling structure and remove the disadvantages of the prior art.

It is an object of the invention to provide a coupling structure with high sealing properties and prevent tearing-off force at the root of the stopper.

It is another object of the invention to provide a coupling structure which avoids stress corrosion at the female screw member.

It is a further object of the invention to provide a coupling structure which may easily control, in design, contacting pressure between the male and female screw portions.

BRIEF DESCRIPTION OF THE INVENTION

For accomplishing the above mentioned objects in the instant invention, a screw coupling joint is provided having a threaded male screw portion and a threaded female screw portion with a sealing portion between an outer convex circumference formed in an axial direction at an end of the male screw member and an inner tapered circumference formed at an inner part of the female screw member, and is structured by contacting the end of the male screw member to a stopper at the inner part of the female screw member, wherein the taper is 1° to 3°, and the inner diameter $D_1$ of the female screw member and the outer diameter $D_2$ of the male screw member have the relation $D_2 > D_1$ at a tangent point therebetween, and the end of the male screw member and the stopper end of the female screw member are formed perpendicular to the axis thereof.

BRIEF DESCRIPTION OF THE DRAWINGS

The invention will be better understood from the following description, taken with the appended drawings, of preferred the invention, in which

FIGS. 1 and 2 show an embodiment of the present invention in a coupling of directly connected end to end pipes. In the drawings, $A_1$ and $A_2$ are pipes connected by a coupling of one embodiment of the invention. The portion 1 of pipe member $A_1$ is a male screw, while the portion 2 of pipe member $A_2$ is a female screw. The outer circumference 11, at the end portion of the male screw portion 1, is a smooth face, without screw thread and is formed in convex in the axial direction. The inner circumference 21 at the inner part of the female screw portion 2 is a smooth face, without screw threads and is formed in taper in the axial direction. A sealing portion S is formed between the smooth convex face of male screw portion 1 and the smooth tapered face of female screw portion 2, forming a seal between outer circumference 11 of male portion 1 and inner circumference 21 of female screw portion 2 when the coupling is assembled, as hereinafter described.

Figure 1:
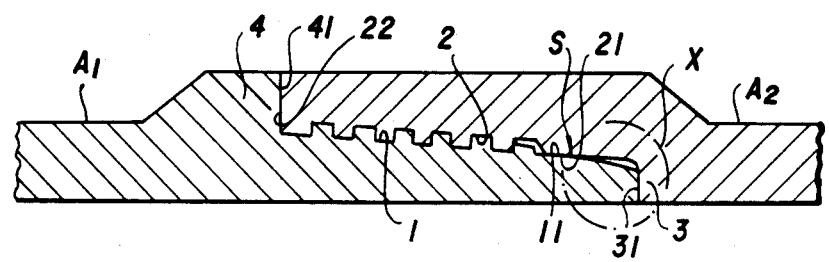
FIG. 1 is a vertical cross sectional view showing one embodiment of a screw coupling for an oil well according to the invention.

Inner circumference 21 of female screw portion 2, at the inner end, terminates in stopper 3 having a terminal face 31 contacted by end face 12 of male screw portion 1 when the coupling is assembled, as hereinafter described.

In the above structure, the terminal end face 31 of stopper 3 and end face 12 of male screw portion 1 contacting terminal end face 31 are formed vertically, that is, are 90° with respect to the pipe axis, in order not to apply a pushing-up force to the male screw portion 1 on the assembling of the coupling and to maintain the sealing property of the sealing portion S through regulation of the size of the outer circumference of female screw portion 2 and the size of the inner circumference of male screw portion 1.

In the conventional coupling structure, there is instability in sealing resulting from restraining the terminal of the male screw portion by the stopper which is cancelled by the pushing force due to the obliquity of the terminal of the male screw portion and the end portion of the stopper. On the other hand, in the arrangement of the present invention, the taper of the inner circumference 21 of the female screw is 1° to 3° and, further, the inner diameter $D_1$ of the female screw portion and the outer diameter $D_2$ of the male screw portion has a relationship of $D_2 > D_1$ to thereby maintain the sealing property of sealing portion S. The taper angle of the inner circumference of the female screw portion 2 is relatively small. Thus, the tangent point is securely provided when the end portion 12 of male screw por-} tion 1 contacts stopper 3 at terminal 31. Sealing between male screw portion 1 and female screw portion 2 is stabilized by the foregoing relationship. For reasons which are obvious, the lead thread of male screw portion has a smaller diameter than the lead thread of female portion 2 to avoid interference between the respective lead threads when the coupling is being assembled.

Figure 2:
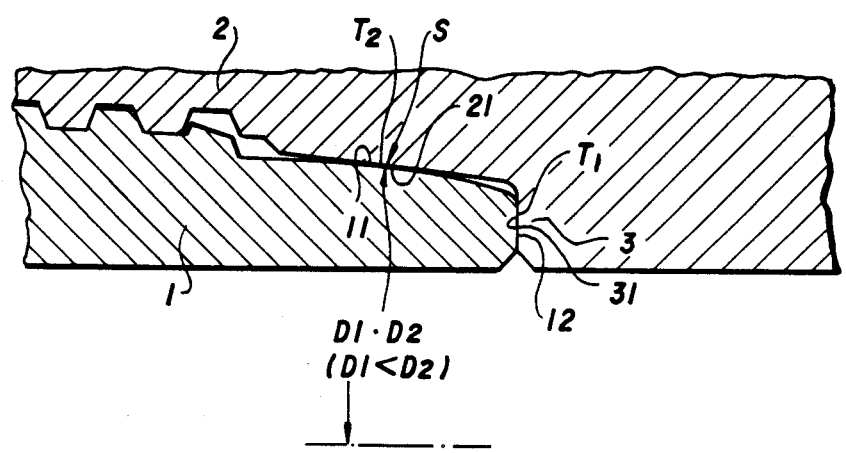
FIG. 2 is an enlarged partial view of the screw coupling of FIG. 1.

In the one embodiment of FIGS. 1 and 2 described above, a stopper 4 is also provided about male screw portion 1 of pipe member $A_1$ and the end portion 22 of female screw portion 2 of female pipe member $A_2$. Thus, as the pipes are assembled to form the sealed coupling, end portion 22 of female screw portion 2 contacts surface 41 of stopper 4, to form a third metal touching seal, that is, the metal touching seals at the seal S, at 3, between surfaces 12, 31 and at 4, between surfaces 22, 41.

Figure 3:
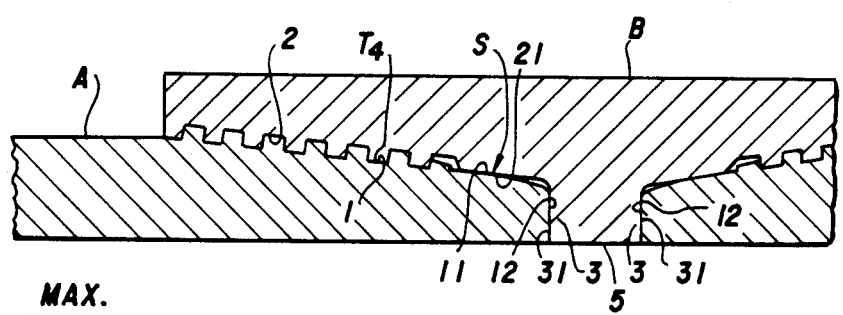
FIG. 3 is a vertical cross section, similar to FIG. 1, but showing another embodiment of the invention.

FIG. 3 shows a further embodiment of the invention in which pipes to be coupled end to end are coupled with a sleeve. As shown in FIG. 3., sleeve B has a female screw portion 2 and an inwardly projecting portion 5 at the axial center of the sleeve, the opposite ends of the projection 4 being provided with stoppers 3, 3, respectively. The ends of the pipes, FIG. 3, are provided with tapered, threaded male ends 1 with outer convex circumferences in an axial direction at the end of the male screws. The coupling sleeve B has, at its opposite ends, female screw portions 2, only one of which is fully shown in FIG. 3 but which, except for facing in opposite directions, are identical to the screw portions, tapered portion and convex portion, shown and described with respect to FIGS. 1 and 2. Thus, in FIGS. 1, 2 and 3, where identical reference numerals are used, the referenced elements and there relative relationships and angularity, where described, are to be taken as the same.

In the above screw coupling joint of the present invention, the outer diameter $D_2$ of the male screw portion 1, slightly larger in diameter than the inner diameter $D_1$ of the female portion 2 when such diameters are brought into contact during assembly, is reduced in diameter at the tangent point as the convex and tapered circumferences are brought into contact and as male screw portion vertical end face 12 is brought into contact with terminal face 31 of stopper 3. High contacting pressure and secure contact conditions are provided by the taper angle of the inner circumference of the female screw portion. Further, because the end face 12 of the male screw portion and the terminal 31 of stopper 3 are vertical, the pushing-up force, encountered in the prior art, does not occur on the end face of the male screw portion. Thus, tearing off forces about the root of the stopper are avoided and stress corrosion is prevented. Further, because the pushing-up force does not occur, the contacting pressure may be easily controlled, in design, at the sealing parts.

In the assembly of the pipe coupling of the instant application torque is applied between the male and female pipe members of FIGS. 1 and 2 or between the male pipe member and female coupling member in FIG. 3. The applied torques to first contact and initiate deflection of the tapered male screw portion S, FIGS. 1, 2 and 3, is designated $T_2$ in FIG. 2. The torque to engage the male and female threads is designated $T_4$, FIG. 3, while the final torque to engage end face 12 of male tread portion 1 with terminal 31 of stopper 3 is designated $T_1$, FIG. 2. As already noted, relatively, the torques in both embodiments are the same.

Figure 4:
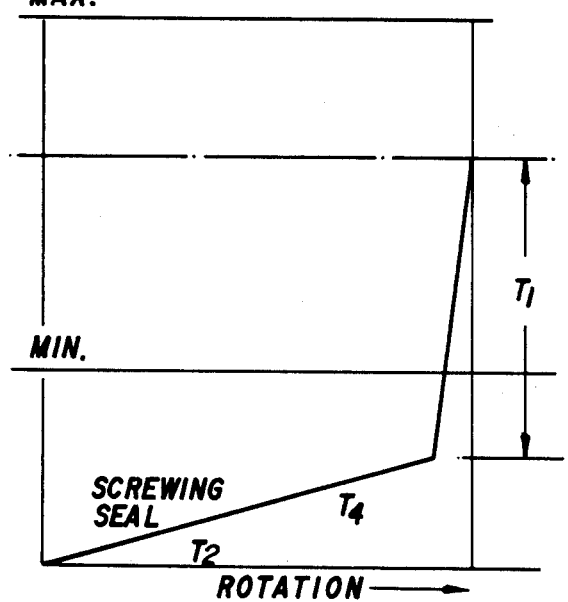
FIG. 4 is a diagram of the various torques as the coupling members are assembled.

The relationships between the torques $T_2$, $T_4$ and $T_1$ are shown in diagram in FIG. 4. If $T_1$ exceeds the yield strength of the pipe material, rupture or breakage of the pipe at the coupling can occur. If, on the other hand, $T_1$ is less than the yield strength of the pipe material, an incomplete coupling is formed and leakage might result. Therefore, $T_1$ should be within the range between the maximum and the minimum of the yield strength, preferably between 30% and 80% of the yield point. For example, in a pipe having an outer diameter of 2⅜ in., nominal wall of 6.50 lb./ft. and yield point of 55 ksi, for applying a compressive stress corresponding to 30% of the yield point of the material to the sealing parts 12 and 31 of the internal shoulder, a $T_1$ tightening torque of 60 kgm is required. For applying a compressive stress corresponding to 80% of the yield point of the material to the sealing parts 12 and 31, a tightening torque of 131 kgm is required.

For purposes of design of couplings in accordance with the instant invention, the values or $T_2$, $T_4$ and $T_1$ may be calculated, as follows:

$$T_2 = \mu \times \frac{pi\ dTG^2}{2} \times WTG \times P \times 10^{-3} \quad [kgm]$$

$$P = \frac{E}{2} \times \frac{(djo^2 - djM^2)(djM^2 - dji^2)}{djM^3\ (djo^2 - dji^2)} \times S - G$$

$$T_4 = \mu \times \frac{pi\ dT^2}{2} \times WT \times P \times 10^{-3} \quad [kgm]$$

$$P = \frac{E}{2} \times \frac{(djo^2 - djM^2)(djM^2 - dji^2)}{djM^3\ (djo^2 - dji^2)} \times (\frac{I}{16})$$

$$T^1 = \mu \times a\ YP \times \frac{pi\ (dso^3 - dsi^3) + 10^{-3}}{12} \quad [kgm]$$

Wherein:
$\mu$: Friction coefficient
E: Young's Modulus
S: Diameter of tangent point of male screw
G: Diameter of tangent point of female screw
YP: Yield point of the material
dso: Outer diameter of inner shoulder
dsi: Inner diameter of inner shoulder
dTG; djM: Outer diameter of main seal part
P: Surface pressure of main seal part
WTG: Contacting width of main seal part
djo: Outer diameter of coupling
dji: Inner diameter of pipe
dT: Average diameter of screw
WT: Length of screw Applying the foregoing to a pipe having a diameter of 2⅜ inches and nominal walls, as listed, the preferred minimum and maximum values of $T_1$ are calculated, as follows:

| Outer Diameter (inch) | Nominal Wall (lbs/ft) | 55 ksi | |
|---|---|---|---|
| | | 0.3 YP | 0.8 YP |
| 2⅜ | 6.50 | 60 kgm (435 lb/ft) | 131 kgm (949 lb/ft) |
| | 7.90 | 80 kgm (580 lb/ft) | 176 kgm (1275 lb/ft) |
| | 8.79 | 98 kgm (645 lb/ft) | 200 kgm (1449 lb/ft) |
| | 9.50 | 95 kgm (688 lb/ft) | 219 kgm (1587 lb/ft) |
| | 10.70 | 109 kgm (790 lb/ft) | 254 kgm (1840 lb/ft) |

The terms and expressions which have been employed in the foregoing description are used as terms of description and not of limitation, and there is no intention, in the use of such terms and expressions, of excluding any equivalents of the features shown and described, or portions thereof, but it is recognized that various modifications are possible within the scope of the invention claimed.

What is claimed:

1. A screw coupling joint having a longitudinal axis and comprising a male screw portion and a female screw portion, the male screw portion having a threaded portion, an end portion with a tapered convex circumferential surface and a contact end having a contact surface with the entire contact surface perpendicular to the longitudinal axis of the coupling unit, the female screw portion having a threaded portion, an end portion with a taper of 1° to 3° and a stopper having a contact surface perpendicular to said longitudinal axis of said coupling joint, said tapered convex end portion of said male screw portion having a contact diameter $D_2$ and said tapered end portion of said female screw portion having a contact diameter $D_1$ where $D_2 > D_1$ and wherein, when said male screw portion is inserted and threaded into said female screw portion by said threads on said male and female portions to make-up said coupling joint, said contact diameter $D_2$ and $D_1$ engage, said end portions at said contact diameters are compressed to form a first metal seal at said contact diameters and, after said first metal seal is formed, said entire perpendicular contact surface of said male screw portion contacts and engages said perpendicular contact surface of said stopper, forms a second metal seal at said perpendicular surfaces and a stop preventing further compression at said first metal seal.

2. A screw coupling joint a set forth in claim 1, wherein the screw coupling joint includes two pipes coupled end to end, one of said coupled pipes includes said male portion and the other of said coupled pipes includes said female portion.

3. A screw coupling joint as set forth in claim 1, wherein said screw coupling joint includes two pipes coupled end to end, each pipe includes, at the coupled ends, said male portion and a sleeve coupled therebetween and includes, at its opposite ends, a female portion coupled to said male portion of said coupled pipes.

4. A screw coupling joint as set forth in claim 1, wherein said male screw portion includes a step portion having a surface perpendicular to said longitudinal axis of said coupling joint and said female screw portion includes a surface perpendicular to said step portion surface for contact therewith and forming a further metal seal therebetween when said coupling joint is assembled.

* * * * *